June 8, 1965  E. A. CHRISTIAN, JR  3,187,495
METHOD AND APPARATUS FOR STRANDING CABLE
Original Filed Oct. 12, 1961  2 Sheets-Sheet 1
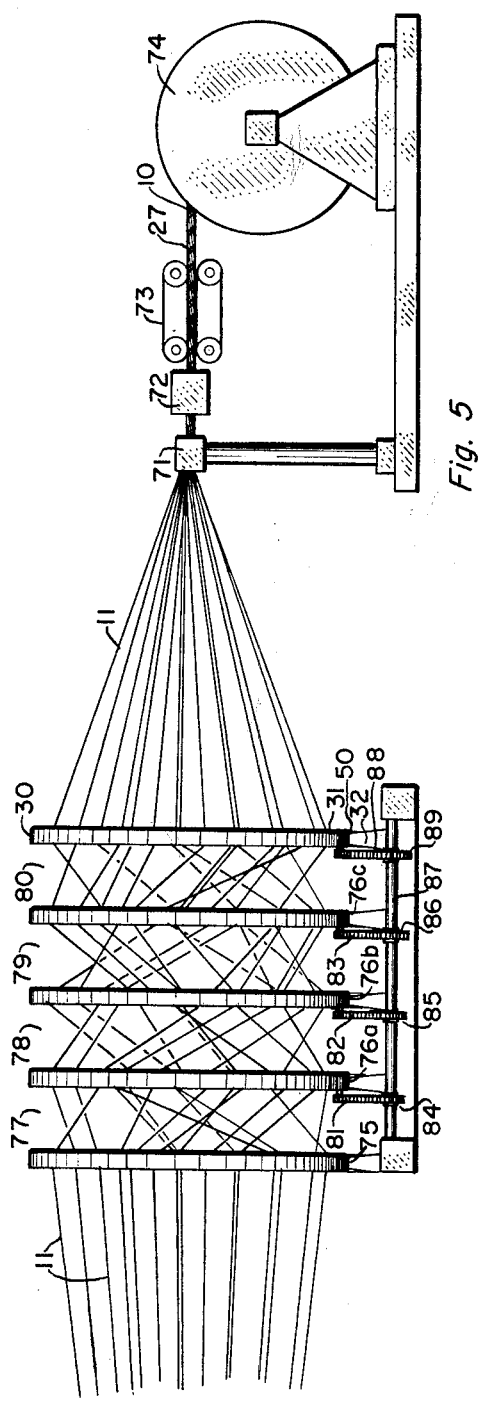
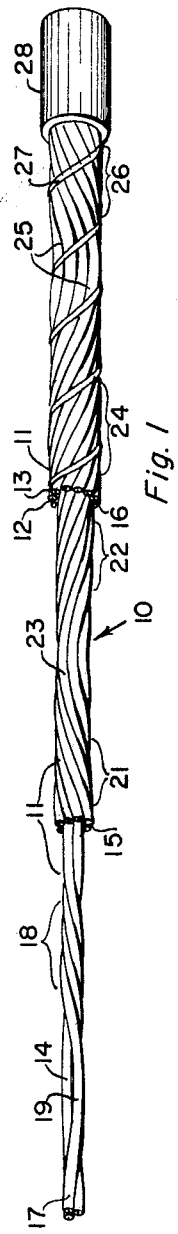
INVENTOR.
EUGENE A. CHRISTIAN, Jr.
BY
HIS AGENT

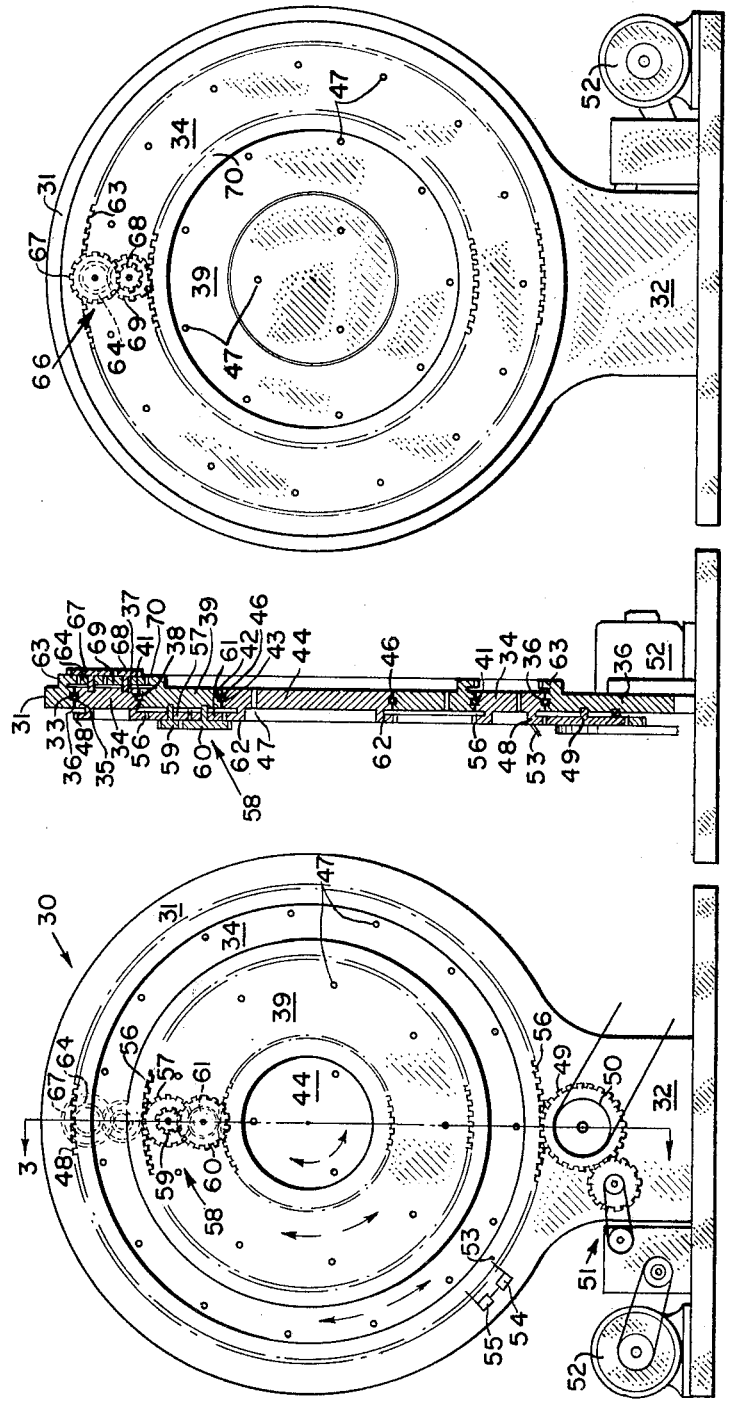

United States Patent Office 3,187,495
Patented June 8, 1965

3,187,495
METHOD AND APPARATUS FOR STRANDING CABLE
Eugene A. Christian, Jr., Loudonville, N.Y., assignor, by mesne assignments, to Anaconda Wire and Cable Company, a corporation of Delaware
Original application Oct. 12, 1961, Ser. No. 144,713. Divided and this application Dec. 17, 1963, Ser. No. 335,708
4 Claims. (Cl. 57—34)

The present application is a division of application Serial No. 144,713, now abandoned.

My invention relates to a method and apparatus for stranding electric cables and particularly to electric cables wherein the conductors are laid in a false twist with the direction of lay alternating from layer to layer.

It has been the usual commercial practice in the manufacture of electric cables, particularly communication cables, to twist the cable conductors in the form of a long helix around the axis of the cable. For large cables, that is for cables made up of large numbers of conductors, the twisting is accomplished by paying the indivdual conductors from spools mounted in stationary racks onto a large reel which is revolved end-over-end in a cradle at the same time it rotates to coil up the twisted conductors. Obviously, this operation will produce cable in which each conductor is given the same length and direction of lay. In referring to conductors in this application I wish the term to be understood to include not only single strands but also strands formed from pairs or quadruplets of conductors by twisting them together and known respectively as conductor pairs or quads. The stranding method and apparatus I have invented can be applied to pairs and quads as well as single conductors.

In order to lessen the incidence of cross-talk between conductors in adjacent layers it has been known to reverse the direction of lay from layer to layer but the cost of making a cable in this manner has prevented its general adoption and most communication cables are made with all the conductors cabled in the same direction of lay.

It has also been known to form cables with a false twist. This is a twist that reverses direction periodically along the length of the cable. To make such a cable it is not necessary to mount the take-up reel in a cradle for end-over-end revolution but merely to pass the conductors through a perforated plate that has a reciprocating rotary motion. To hold the false-twist in the conductors they are bound together such as by the application of a binder tape immediately upon emerging from a forming die. This method, like the conventional stranding method hereinbefore mentioned, results in the formation of a cable in which the conductors in all layers have the same direction of lay.

It is an object of my invention to make an electric cable comprising a plurality of layers each with a plurality of conductors where the conductors in at least one layer are laid parallel in the form of a helix having its direction of lay reversed periodically along its length and differing from the lay of conductors in an adjacent layer. My cable will preferably have at least two layers with the conductors of one laid parallel in the form of a helix with its direction reversed periodically along the length of the cable but differing from the direction of lay of the conductors of the other layer. Instead of conductors my cables described above may comprise conductor pairs or quads.

I have invented the method of making a cable with the direction of lay of its strand elements reversed periodically along its length and radially through its layers. My method comprises the steps of arranging strand elements in concentric layers, reciprocatingly rotating the layers in alternately opposite directions, bringing the layers together and applying a constraining element around the outermost layer.

I have also invented apparatus for making the cable of my invention. My apparatus comprises a plurality of ring plates each perforated to receive a plurality of cable strands. It also comprises means for imparting a first reciprocating rotary motion to one of said ring plates, means for imparting a second reciprocating rotary motion to another of said ring plates with the second motion out-of-phase from the first motion. My apparatus also comprises means for advancing a plurality of strands through the perforations in the ring plates, means for bringing the strands together at a station downstream of the plates and means for confining the strands together. In a preferred embodiment the ring plates of my apparatus have outer perimeters and the perforations are circularly spaced with perforations in each successive plate spaced in a circle of diameter greater than the perimeter of the adjacent plate.

A more thorough understanding of my invention may be obtained from the appended drawing.

In the drawing:

FIGURE 1 is a side view of a cable made to my invention.

FIGURE 2 is a front view of a stranding apparatus of my invention.

FIGURE 3 is a side view in section of the apparatus of FIGURE 2.

FIGURE 4 is a rear view of the apparatus of FIGURE 2.

FIGURE 5 is a side view of the apparatus used in the method of my invention.

FIGURE 1 shows a cable indicated generally by the numeral 10 comprising a plurality of conductors 11—11, each with a central conducting wire 12 and an annular insulating wall 13. Although for the sake of simplicity I have shown each of the conductors or strands 11 as comprising a single insulated wire such as might, for example, make up a control cable it will be understood that my invention finds particular application for telephone cables wherein each of the strands 11 is comprised of a twisted pair, that is, two insulated conductors that have previously been twisted together and insofar as my invention is concerned may be handled as a single conductor. Similarly the strand 11 may be comprised of four twisted conductors in the form of a quad. The strands 11 are shown as forming three concentric layers 14, 15, 16 although this number is, of course, not limiting and larger cables or two-layer cables may be advantageously made in accordance with the principles of my invention. The layer 14 is seen to consist of three of the strands 11 twisted in the form of a helix but with the exposed length of the layer 14 not all twisted in the same direction. At the left there is a length 17 which is seen to have a right-hand lay and at the right a length 18 is seen to have a left-hand lay. In between the lengths 17, 18 the strands of the layer 14 pass through a reversal point 19 where the direction of lay reverses. This pattern of twists, countertwists and reversal points is repeated periodically down the length of the cable.

The layer 15 applied over the layer 14, is made up of a larger number of the strands 11. For example the inner core or layer 14 may typically be comprised of three conductors while the layer 15 will have nine. The layer 15 is seen to be twisted in a left-hand lay at a length 21 to the left and with a right-hand lay at a length 22 to the right. The layer 15 has a reversal point at 23. Cross-talk is always likely to occur between two wires in a communication cable that lie parallel and in proximity to each other. The likelihood of cross-talk between wires in dfferent layers is removed if they are wound in opposite directions of lay and it can be seen in FIGURE 1 that the left-hand lay of the length 21 of the layer 15 covers a length of the layer 14 with a right-hand lay. However, although it may be preferable to reverse the lays of the alternate layers this degree of difference is not essential to avoid cross-talk and my invention has value where the directions are different without necessarily being reversed at every section.

The layer 16 comprised typically of 15 conductors, is applied with a right-hand lay at a length 24 which is seen to cover a portion of the layer 15 which has a left-hand lay. The layer 16 also passes through a reversal point 25 after which it assumes a left-hand lay in a length 26. A binder tape 27 is wrapped around the cable over the layer 16 and a jacket 28 is applied overall. The tape 27 serves to prevent the conductors from untwisting prior to the application of the jacket and is generally desirable to provide a good, tight core for the jacketing operation. However, the tape 27 is not necessarily essential to my invention where there are other means of binding the conductors together such as by applying the jacket 28 before the strands have a chance to unwind.

In order to strand the cable of FIGURE 1, I have invented stranding apparatus of which a preferred embodiment is shown in FIGURES 2–5. In my apparatus designated generally by the numeral 30, a stationary vertical ring plate 31 is fixedly mounted on a support 32 transversely to the line of advance of strands 11 as shown in FIGURE 5. The plate 31 is internally grooved to form a ball bearing race 33 wherein is rotably supported a smaller ring plate 34 which has a matching groove 35 to confine steel balls 36—36. The internal surface of the plate 34 has a groove 37 matching a groove 38 in a ring plate 39 which rotates on steel balls 41—41. The ring plate 39 has a groove 42 matching a groove 43 in a circular plate 44 which is rotably supported on steel balls 46—46. Although I prefer to provide ball bearing support for the plates 34, 39 and 44 to reduce friction to a minimum, I do not wish to be limited thereto and the scope of my invention encompasses other known types of bearing surfaces. Each of the plates 34, 39, 44 has perforations 47—47 for guiding the conductors 11. I have shown perforations in each plate to match the number of strands in the corresponding layer of the cable 10 but this is not limiting. Particularly, each of the plates 34, 39, 44 may have a large number of excess perforations to accommodate cables of different constructions without thereby lessening their effectiveness for the manufacture of the cable 10 of FIGURE 1. It will be further understood that, although I have shown three perforated plates 34, 39, 44 a two-layered cable might require only two perforated plates while a cable of more than three layers might require that the apparatus have a correspondingly larger number of perforated ring plates. The largest perforated plate 34 comprises an integral ring gear 48. Alternatively the gear 48 may be attached to the plate 34 by known methods. Rotatably mounted on the plate 31 is a spur gear 49 meshing with the gear 48, a sprocket 50 coaxial to the gear 49 is lockedly mounted thereto for a purpose hereinafter to be described. The gear 49 is connected by means of a reducing gear box and sprocket-chain assembly indicated generally by the numeral 51 or equivalent mechanism to a reversing motor 52. A pin 53 projecting from the plate 34 actuates either of two limit switches 54, 55 which are connected in a known manner by a relay circuit not shown to reverse the motor 52. When the switches 54, 55 are mounted on the plate 31 in the manner shown they will cause the plate 34 to oscillate through an angle of approximately 360°. By separating the distance between the switches 54, 55 the angle of oscillation can be reduced as desired.

The ring plate 34 is also provided, integrally as shown, or by other known means with an internal gear 56 which meshes with a spur gear 57 rotably mounted on the plate 39. The gear 57 is a member of a gear train indicated generally by the numeral 58 comprising, in addition to the gear 57, a smaller coaxial gear 59 fixed thereto and a pair of coaxial gears 60, 61. The gear 60 meshes with the gear 59 and the gear 61 meshes with a ring gear 62 integral with or otherwise affixed to the plate 44. By means of the train 58 the plate 44 will be caused to rotate in the same direction as the plate 34 relative to the plate 39. The dimensions of the gears are chosen to compensate for the difference in diameters of the plates 34, 44 so that their oscillations will have equal angular displacements. It is also within the scope of my invention to impart different angular rotations to the two plates. Particularly the plate 44 may be given an angular rotation greater than the plate 34 but I prefer that it should not exceed 360°.

On the face of my apparatus opposite to the gears so far described the plate 31 has an internal gear 63 which meshes with a small spur gear 64 comprising part of a gear train indicated generally by the numeral 66 and mounted on the plate 34. Other members of the gear train 66 are a large spur gear 67 coaxial with and locked to the gear 64 and a coaxial pair of locked gears 68, 69. The gear 68 meshes with the gear 67 and the gear 69 meshes with a ring gear 70 on the plate 39. The gears 63, 64, 67, 68, 69, 70 interact to oscillate the plate 39 in a direction opposite to that of the plate 34 and I prefer that the sizes of the gears shall be selected in a known manner to impart a displacement to the plate 39 equal in angle but opposite in direction to that of the plate 34 but other displacements will be understood to come within the scope of my invention although I prefer that the twist imparted by the plate 39 shall not exceed 360°.

Referring now to FIGURE 5, I have mounted a forming die 71 downstream of my oscillating apparatus 30 for bringing together the strands 11 and immediately downstream of the die 71 I have mounted a binding head 72 which applies the binding tape 27 to prevent opening up of the cable 10. The bound cable passes through a caterpillar capstan 73 driven by known means not shown to advance the cable 10 and the conductors 11 through my stranding apparatus at a linear speed having any desired ratio to the speed of oscillation imparted by the motor 52. The bound cable is then taken up on a reel 74 for removal to an extrusion apparatus, not shown, wherein the jacket 28 may be applied. Alternative means may be used for binding the strands leaving the die 71. For example if the extrusion apparatus for the jacket 28 is located close enough to the die 71 to avoid any falling apart of the strands the binding head 72 may be omitted. When the oscillating plates in the apparatus 30 rotate they impart a back twist to the strands 11 upstream of the apparatus 30 which, depending on the magnitude of the angle of oscillation may have the effect of entangling the strands feeding into my apparatus. To avoid this contingency I have provided a stationary vertical lay plate 75 having perforations matching the perforations in the reciprocating apparatus 30 but itself having no moving parts. The strands 11 are threaded into the perforations in the plate 75 from a conventional reel stand and sheave rack not shown. Between the plate 75 and the apparatus 30 are three oscillating mechanisms 76a, 76b, 76c spaced so as to leave approximately equal distances 77, 78, 79, 80 between plates. The mechanisms 76a, 76b, 76c are substantially identical to the apparatus 30 except that they lack the limit switches 54, 55 and the gear train 51 and are driven through chain belts 81, 82, 83 driven by sprockets 84, 85, 86 on a drive shaft 87 which is in turn driven by the sprocket 50 through a chain belt 88 and sprocket 89. The sprockets are so chosen that angle of oscillation of the plates in the mechanisms 76a, 76b, 76c, 30 will be proportional to their distances from the plate 75. By thus driving the mechanisms 76a, 76b, 76c I minimize the drag in the strands 11. Where tensioning of the strands is not objectionable slotted guide plates may be used instead of the mechanisms 76a, 76b, 76c.

I have invented a novel and useful method and apparatus for making a cable for which invention I desire the award of Letters Patent.

I claim:

1. The method of making a cable having the direction of lay of its strand elements reversed periodically along its length and radially through its layers comprising the steps of arranging said elements in a plurality of concentric, radially separated layers, reciprocatingly rotating each of said separated layers in alternately opposite directions, bringing said layers together and applying a constraining element around the outermost of said layers.

2. Stranding apparatus for making a cable having the direction of lay of its strands reversed periodically along its length and radially through its layers comprising a plurality of concentric ring plates at a common station having outer perimeters and circularly spaced perforations, said perforations in each successive plate being spaced in a circle of diameter greater than the perimeter of the adjacent plate, means for advancing a plurality of strands through said perforations, means for reciprocating said plates in alternately opposite directions whereby said strands will be arranged in layers having helical lays of alternately opposite direction, and die means for bringing said strands together.

3. Stranding apparatus for making a cable having the direction of lay of its strands reversed periodically along its length and radially through its layers comprising an outer stationary vertical ring plate, a first smaller concentric ring plate rotatably mounted on said outer plate, means for imparting a reciprocating rotary motion to said first plate, said first plate having a plurality of perforations therein for receiving a like plurality of strands, a second concentric ring plate smaller than said first plate and rotatably mounted therein, said second plate having a plurality of perforations therein for receiving a like plurality of strands, an internal gear mounted on said stationary ring plate, gear means mounted on said first plate, a ring gear mounted on said second plate, said gear means engaging said internal gear and said ring gear so as to impart a reciprocating motion to said second plate opposite in direction to the motion of said first plate.

4. The method of making a cable having the direction of lay of its strand elements reversed periodically along its length and radially through its layers comprising the steps of continuously advancing said elements through a fixed station while said elements are arranged in a plurality of radially separated concentric layers, reversingly displacing said layers rotationally relative to each other while they are still radially separated at said station, and bringing said layers together while they are in displaced relation.

References Cited by the Examiner

UNITED STATES PATENTS

| | | | |
|---|---|---|---|
| 2,058,234 | 10/36 | Johannessen | 57—15 |
| 2,128,410 | 8/38 | Hall | 174—34 |
| 3,025,656 | 3/62 | Cook | 57—64 X |

FOREIGN PATENTS

| | | |
|---|---|---|
| 631,929 | 6/36 | Germany. |
| 646,346 | 6/37 | Germany. |

MERVIN STEIN, *Primary Examiner.*